(12) United States Patent
Demeulenaere et al.

(10) Patent No.: US 10,508,616 B2
(45) Date of Patent: Dec. 17, 2019

(54) OIL FLOW CONTROL FOR AN ENGINE BY DEFLECTION

(71) Applicant: Ford Global Technologies, LLC, Dearborn, MI (US)

(72) Inventors: Xavier Demeulenaere, London (GB); Graham Slaughter, Brentwood (GB); Mark Michel, Dartford (GB); David Harknett, Hockley (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/427,601

(22) Filed: May 31, 2019

(65) Prior Publication Data
US 2019/0285025 A1    Sep. 19, 2019

Related U.S. Application Data

(62) Division of application No. 15/609,521, filed on May 31, 2017, now Pat. No. 10,364,772.

(30) Foreign Application Priority Data

Jun. 6, 2016 (GB) .................................. 1609835.2

(51) Int. Cl.
*F02F 7/00* (2006.01)
*F02F 11/00* (2006.01)
(Continued)

(52) U.S. Cl.
CPC ............ *F02F 7/0068* (2013.01); *F02F 11/00* (2013.01); *F16J 15/062* (2013.01); *F16N 31/02* (2013.01); *F02F 2007/0056* (2013.01)

(58) Field of Classification Search
CPC .. F02F 7/0068; F02F 11/00; F02F 2007/0056; F16N 31/02; F16J 15/062
See application file for complete search history.

(56) References Cited

U.S. PATENT DOCUMENTS 6,189,499 B1 * 2/2001 Iwata .................... F16F 15/265
123/192.2
6,912,985 B2    7/2005 Gesell et al.
(Continued)

FOREIGN PATENT DOCUMENTS

JP    S5571038 U    5/1980
JP    S55116837 U    8/1980
(Continued)

OTHER PUBLICATIONS

Great Britain Search Report for Application No. GB1609835.2, dated Jul. 29, 2016, 4 pages.

*Primary Examiner* — Jacob M Amick
*Assistant Examiner* — Charles Brauch
(74) *Attorney, Agent, or Firm* — Brooks Kushman P.C.; Geoffrey Brumbaugh

(57) ABSTRACT

An engine is provided with a cylinder block and a ladder-frame having a portion of an oil conduit and a deflector. The engine has a metal-to-metal seal positioned between the ladderframe and block to circumferentially surround the oil conduit, and has a gasket seal positioned between the ladderframe and block to be outboard and spaced apart from the oil conduit. The deflector is positioned between the metal-to-metal seal and the gasket seal. An engine component is provided with a member having a deflector and forming an oil conduit. The deflector has an arcuate deflector surface following an outer wall of the oil conduit to redirect oil escaping the oil conduit. A ladderframe is configured to provide a deflection surface, with the deflection surface positioned to guide high pressure oil away from adjacent RTV seals.

20 Claims, 2 Drawing Sheets

(51) Int. Cl.
    *F16J 15/06*      (2006.01)
    *F16N 31/02*      (2006.01)

(56)         References Cited

U.S. PATENT DOCUMENTS 6,994,078  B2   2/2006   Roberts et al.
    2002/0115361 A1  8/2002  Nozue
    2015/0075477 A1  3/2015  Kitamura
    2015/0137585 A1  5/2015  Ono

FOREIGN PATENT DOCUMENTS

JP       H08135458  A    5/1996
    JP       H08177446  A    7/1996
    JP       2004245081 A    9/2004
    JP       2008133809 A    6/2008
    JP       2010138702 A    6/2010
    JP       2015086705 A    5/2015
    WO       2014014791 A1   1/2014
    WO       2014152300 A1   9/2014

* cited by examiner

OIL FLOW CONTROL FOR AN ENGINE BY DEFLECTION

CROSS-REFERENCE TO RELATED APPLICATIONS

This application is a division of U.S. application Ser. No. 15/609,521 filed May 31, 2017, now U.S. Pat. No. 10,364,772 B2, which, in turn, claims foreign priority benefits under 35 U.S.C. § 119(a)-(d) to GB 1609835.2 filed Jun. 6, 2016, the disclosures of which are hereby incorporated in their entirety by reference herein.

TECHNICAL FIELD

This invention relates to improvements in or relating to the use of features intended to control the flow of a lubricant, also referred to as oil, within a vehicle engine, and in particular to the deflection of flow of oil.

BACKGROUND

Metal-to-metal seals are deployed in various locations within automotive systems, typically for internal seals in parts of the system where there is some tolerance of imperfection, that is, where the seal may still perform its required function despite being less than 100% effective.

For example, the oil connections in the low end of an engine which are internal to the engine may still function effectively where seals are less than perfect, because oil escaping through these seals will drain back to the oil sump. The oil can safely drain back to the oil sump without exiting the engine. Therefore there is no detrimental effect on the perceived quality of the engine which will continue to run, but the fuel consumption of the engine will increase and the pumping requirements will also increase. It therefore remains the aim to improve or maximize the efficiency of sealing throughout the engine.

When a metal-to-metal seal starts to leak, it can result in a jet of oil spraying from the leak point. If the conduit containing the seal is a high pressure conduit, then the oil may be at high pressure or pressurized. This oil can cause damage to adjacent seals, particularly those formed from room temperature vulcanizing (RTV) silicone rubber.

It is against this background that the present invention has arisen.

SUMMARY

According to embodiments of the present invention there is provided a ladderframe or engine component configured to provide a deflection surface positioned to guide high pressure oil away from adjacent RTV seals. If high pressure oil is incident directly on RTV seals, the oil may cause the seal to fail over time. The deflection surface is configured to divert the high pressure oil to prevent it from landing directly on the RTV seal. In this way the integrity of the RTV seal is preserved and with it the efficiency of the engine and the user's perception of the quality of the engine.

In an embodiment, an engine is provided with a cylinder block defining a portion of an oil conduit intersecting a lower surface of the block, and a ladderframe having an upper surface intersecting another portion of the oil conduit and a deflector adjacent to the another portion of the oil conduit. The engine has a metal-to-metal seal positioned between the upper surface of the ladderframe and the lower surface of the block to circumferentially surround the oil conduit, and a gasket seal positioned between the upper and lower surfaces to be outboard and spaced apart from the oil conduit. The deflector is positioned between the metal-to-metal seal and the gasket seal.

In another embodiment, an engine component is provided with a member having a deflector and forming an oil conduit intersecting an upper surface. The oil conduit has an inner wall and an outer wall extending transversely to the upper surface. The deflector has an arcuate deflector surface following the outer wall of the oil conduit and positioned adjacent to and radially outboard thereof to redirect oil escaping the oil conduit and flowing towards an adjacent room temperature vulcanizing seal.

The invention will now be further and more particularly described, by way of example only, and with reference to the accompanying drawings, in which:

DETAILED DESCRIPTION

As required, detailed embodiments of the present disclosure are provided herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
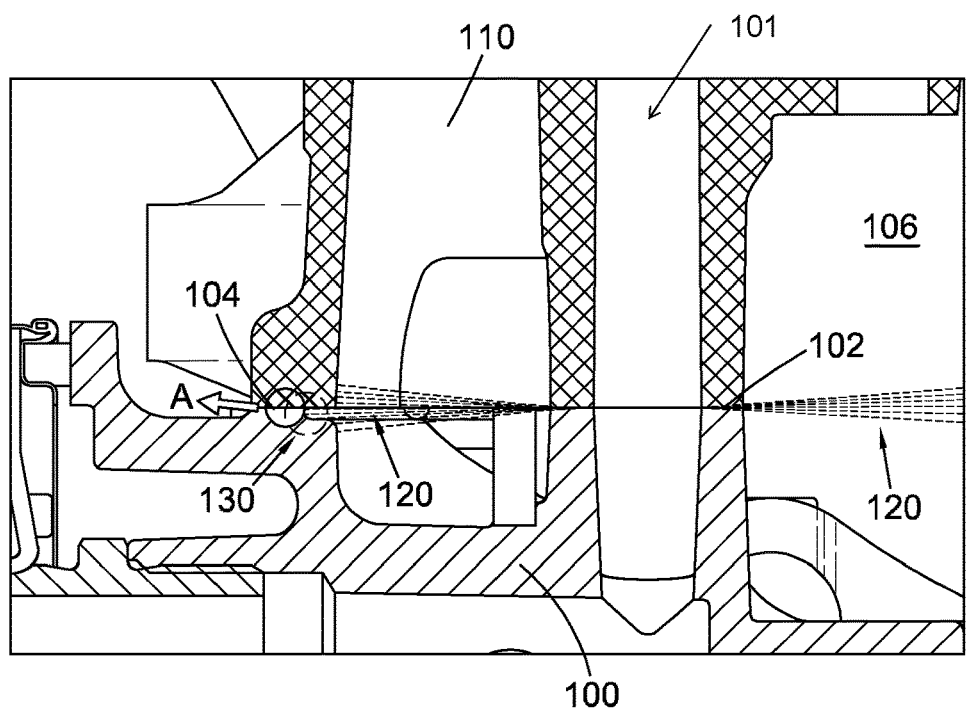
FIG. 1 shows a cross section through a prior art ladderframe and highlights the area of concern.

FIG. 1 shows a ladderframe 100 and cylinder block 110 of an engine where the ladderframe is positioned between the cylinder block on an oil sump (not shown). The ladderframe 100 may support main bearings and an engine crankshaft. Each of the ladderframe 100 and the cylinder block 110 define portions of a high pressure oil conduit 101 that are in direct fluid connection when the ladderframe 100 is connected to the cylinder block 110. There are two seals between the ladderframe 100 and the cylinder block 110: a metal-to-metal seal 102 is provided midway along a high pressure oil conduit 101 adjacent to the inner engine 106 and a gasket seal 104 is provided at the interface further from the inner engine 106, for example, along an outer edge region of the ladderframe and cylinder block. A lower surface of the cylinder block 110 cooperates with an upper surface of the ladderframe 100 and the seals 102, 104 when the engine is assembled.

A metal-to-metal seal 102 is chosen for the inner seal because if the seal fails then oil escaping from the conduit 101 between the ladderframe 100 and the cylinder block 110 will drain back into the oil sump. Whilst this will have some negative impact in terms of efficiency of the engine, failure of this seal cannot directly result in the oil exiting the engine and thereby damaging the users' perception of the engine overall. As a metal-to-metal seal is more economical to implement due to the lack of additional parts or additional sealant application being required during assembly and as it has limited negative impact in the case of failure, it is preferred for this location.

A gasket seal 104 is provided at the interface further from the inner engine 106. A gasket seal includes an additional part, typically in the form of a room temperature vulcanizing (RTV) gasket or O-ring which ensures that no oil leaks. This is particularly important at this location because oil leaking from this seal 104 would not naturally drain back to the oil sump and could exit the engine, adversely affecting the users' perception of the engine.

FIG. 1 shows the path taken by oil 120 in the situation where the metal-to-metal seal 102 has failed with a conventional ladderframe and oil is leaking from the conduit 101. The oil 120 is incident on the gasket seal 104. The oil 120 is at high pressure and could compromise the integrity of the gasket seal 104. This therefore creates an area of concern 130. If the high pressure oil or pressurized oil 120 did damage the gasket seal 104 then oil could seep from the engine in the direction marked by arrow A.

Figure 2:
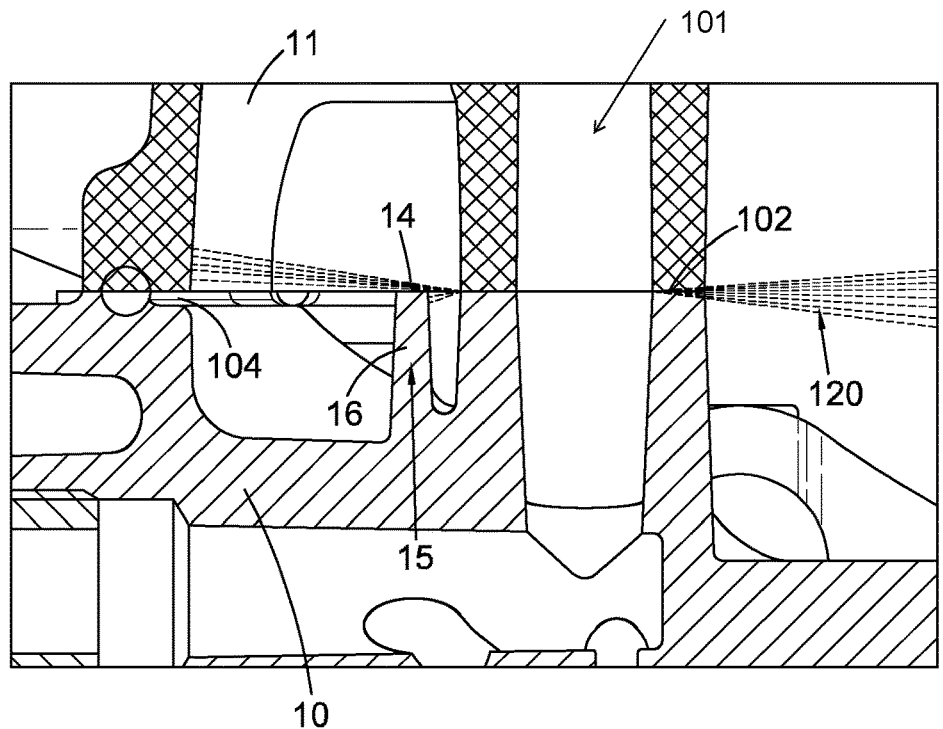
FIG. 2 shows a cross section through a ladderframe according to the present invention.

FIG. 2 shows the same cross section through a ladderframe 10 and cylinder block 11 as FIG. 1, but the ladderframe 10 shown in FIG. 2 is provided with a deflection surface 14 or deflector surface 14 according to the present disclosure. The deflector 15 is integral with the ladderframe 10. The ladderframe 10 is a cast part and the deflector 15 is produced as part of or during the casting process.

The deflector 15 includes a support 16 and a deflection surface 14. The deflector 15 disrupts the oil 120 spraying from the metal-to-metal seal 102 and diverts it back towards the oil sump (not shown) beneath the ladderframe 10, and opposed to the cylinder block 11. As will be readily apparent from FIG. 2, the gasket seal 104 is no longer in the path of oil 120 spraying from the metal-to-metal seal 102.

Figure 3:
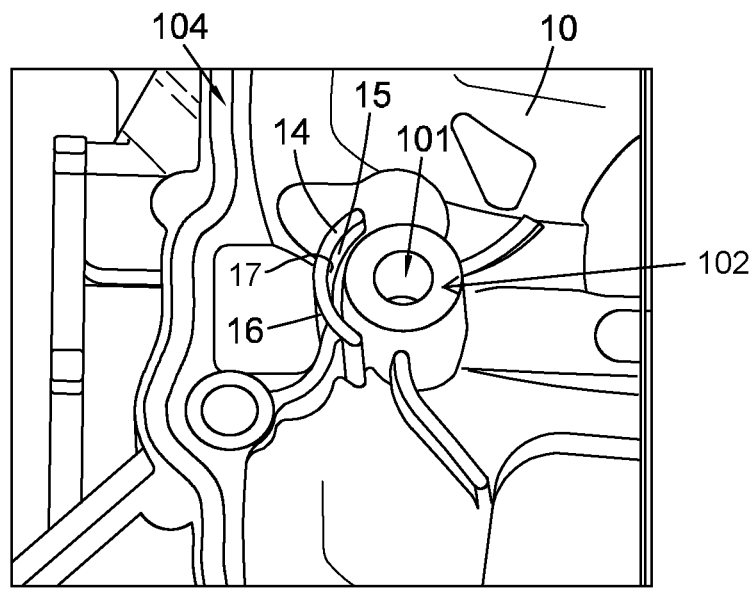
FIG. 3 shows a perspective view of a deflection surface.

FIG. 3 shows a part perspective view of the ladderframe 10 clearly showing the deflector 15. The deflector 15 has an elongate support 16 and a deflection surface 14. The deflection surface 14 is arcuate. The deflection surface 14 conforms closely to, but does not touch, the metal-to-metal seal 102 in the high pressure oil conduit 101 leading from the ladderframe 10 into the cylinder block 11. The deflection surface 14 arc is a circular arc with a radius slightly larger than the radius of the conduit 101, or slightly larger than a radius of the outer surface or outer wall of the conduit 101. As shown, the inner edge 17 of the deflection surface 14 is spaced apart from the outer edge or surface of the high pressure oil conduit 101, and has a radius that is larger than the adjacent radius of the conduit 101. The support 16 extends away from the deflection surface 14, initially substantially orthogonally and then curves away to interface with the surface of the ladderframe 10. The exact configuration of the support 16 is not critical to the functioning of the deflector 15, the support 16 will be shaped in any way practical to provide the deflection surface 14 in a position to divert the high pressure oil spray away from the gasket seal 104.

The top part of the deflection surface 14 can be machined if required as a result of process constraints. In the illustrated embodiment, the top of the deflector 15 is machined at the same time as the joint surface of the ladderframe 10 or surface that cooperates with the block 11 and seal 102, such that the defector top is co-planar with the surface of the ladderframe. This is due to the proximity between the conduit 101 and the deflector 15 and the size of the cutter. However, in some embodiments, the top surface could be machined separately if it was far enough from the conduit 101. In such a configuration the deflector 15 would be higher than the metal-to-metal seal 102, or offset above the ladderframe surface, thereby optimizing protection of the RTV seal 104.

The deflection surface 14 illustrated in FIG. 3 has a substantially constant cross sectional area or substantially constant width along the length of the deflector, tapering slightly at the ends or end regions. This delivers the required deflection of the oil, with a minimal addition to the overall weight of the ladderframe 10. However, it would also be understood that the thickness of the deflection surface 14 could vary whilst still allowing the deflection surface 14 to function as required.

The deflection surface 14 illustrated in FIG. 3 has an arcuate shape with a substantially constant angle of curvature. However, in other embodiments not illustrated in the accompanying drawings, the curvature may be non-uniform or even non-existent. The curvature may be modified in order to guide the oil incident on the deflection surface 14 back to the oil sump (not shown).

Figure 4:
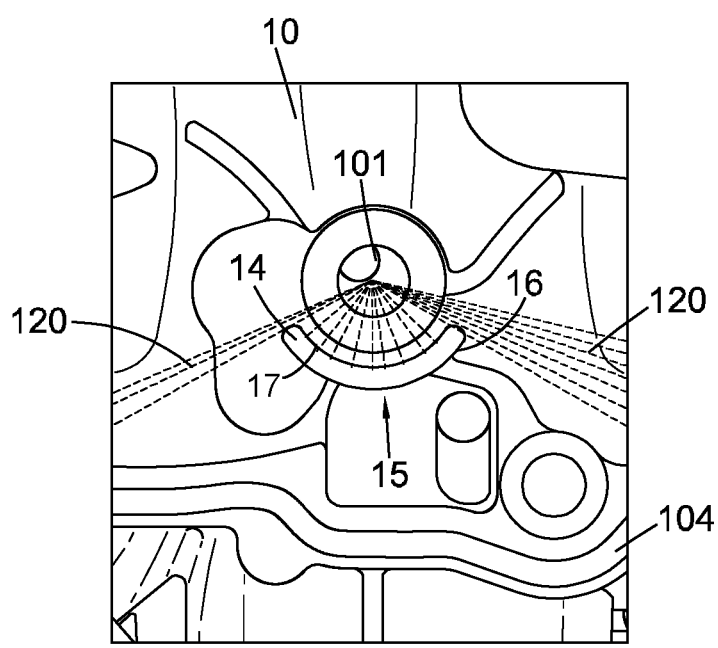
FIG. 4 shows how the deflection surface would operate in accordance with the present invention.

FIG. 4 shows an end view of the conduit 101 with the deflector 15 and deflection surface 14 diverting incident oil 120 to protect the gasket seal 104.

According to embodiments of the present invention there is provided a ladderframe configured to provide a deflection surface positioned to guide high pressure oil away from adjacent RTV seals. If high pressure oil is incident directly on RTV seals, the oil may cause the seal to fail over time. The deflection surface is configured to divert the high pressure oil to prevent it from landing directly on the RTV seal. In this way the integrity of the RTV seal is preserved and with it the efficiency of the engine and the user's perception of the quality of the engine.

The deflection surface may be integral with the ladderframe so that the provision of the deflection surface does not entail any additional manufacturing steps or components.

The ladderframe, including the deflection surface, may be provided as a cast part. Casting can achieve the complex geometries required to provide the ladderframe with the deflection surface in a single manufacture step.

The deflection surface may be arcuate. An arcuate deflection surface will guide oil incident thereon to flow safely back to the oil sump without being incident on the RTV seals.

At least part of the deflection surface, in particular the top part of the deflection surface can be machined if required by the process.

It will further be appreciated by those skilled in the art that although the invention has been described by way of example with reference to several embodiments it is not limited to the disclosed embodiments and that alternative embodiments could be constructed without departing from the scope of the invention as defined in the appended claims. While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. An engine comprising:
   a cylinder block defining a portion of an oil conduit intersecting a lower surface of the block;

a ladderframe having an upper surface intersecting another portion of the oil conduit and a deflector adjacent to the another portion of the oil conduit;

a metal-to-metal seal positioned between the upper surface of the ladderframe and the lower surface of the block to circumferentially surround the oil conduit; and a gasket seal positioned between the upper and lower surfaces to be outboard and spaced apart from the oil conduit;

wherein the deflector is positioned between the metal-to-metal seal and the gasket seal.

2. The engine of claim 1 wherein the deflector extends from the ladderframe towards the cylinder block.

3. The engine of claim 1 wherein the deflector has a top surface that is co-planar with the upper surface of the ladderframe.

4. The engine of claim 1 wherein the deflector has a top surface that is offset from the upper surface of the ladderframe such that the lower surface of the block is positioned between the upper surface of the ladderframe and the top surface of the deflector.

5. The engine of claim 1 wherein the deflector is arcuate.

6. The engine of claim 1 wherein the deflector conforms to and follows an outer surface of the another portion of the oil conduit.

7. The engine of claim 6 wherein a radius of an inner edge of the deflector is greater than a radius of the outer surface of the another portion of the oil conduit.

8. The engine of claim 1 wherein the gasket seal comprises a room temperature vulcanizing (RTV) material.

9. The engine of claim 1 wherein the deflector is defined by a deflector surface and an elongate support.

10. The engine of claim 9 wherein the elongate support extends orthogonally from the deflector surface towards the ladderframe.

11. The engine of claim 9 wherein the deflector surface is formed by an arcuately shaped surface.

12. The engine of claim 11 wherein the deflector surface has a constant width along a length of the deflector with opposite end regions of the deflector surface being tapered.

13. The engine of claim 1 wherein the ladderframe defines the another portion of the oil conduit as a tubular structure having an inner wall and an outer wall extending transversely to the upper surface, and a component mating face extending between and connecting the inner and outer walls, the inner wall defining an oil passage therein.

14. The engine of claim 13 wherein the deflector has an arcuate deflector surface following the outer wall of the another portion of the oil conduit, the deflector positioned adjacent to and radially outboard of the outer surface to redirect oil escaping the oil conduit and flowing towards the gasket seal.

15. The engine of claim 13 wherein the block defines the portion of the oil conduit as another tubular structure having another inner wall and another outer wall extending transversely to the lower surface, and another component mating face extending between and connecting the another inner and outer walls, the inner wall defining the oil passage therein;

wherein the inner wall of the ladder frame and the another inner wall of the block are aligned with one another;

wherein the outer wall of the ladder frame and the another outer wall of the block are aligned with one another; and wherein the component mating face of the ladderframe and the another component mating face of the block are each in contact with the metal-to-metal seal.

16. The engine of claim 1 wherein the deflector extends transversely to the upper surface of the ladderframe from an elongate support to a top face to provide an arcuate deflector surface.

17. The engine of claim 16 wherein a radius of the deflector surface is greater than a radius of the outer wall of the another portion of the oil conduit such that the deflector partially surrounds the oil conduit.

18. The engine of claim 1 wherein the deflector has first and second ends connected by an inner concave wall, the inner concave wall extending outwardly from the upper surface of the ladderframe to a top surface of the defector.

19. The engine of claim 18 wherein the deflector has an outer convex wall extending between and connecting the first and second ends, the outer convex wall extending outwardly from the upper surface of the ladderframe to the top surface of the deflector.

20. The engine of claim 1 wherein the ladderframe member defines a groove sized to receive the gasket seal, the deflector surface positioned between the oil conduit and the groove and shaped to redirect oil escaping the oil conduit and flowing towards the seal.

* * * * *